United States Patent
Lefol et al.

(10) Patent No.: US 8,442,122 B2
(45) Date of Patent: May 14, 2013

(54) COMPLEXITY SCALABLE VIDEO TRANSCODER AND ENCODER

(75) Inventors: Damien Lefol, Colchester (GB); David Bull, Bristol (GB); Nishan Canagarajah, Bristol (GB)

(73) Assignee: STMicroelectronics NV, Amsterdam (NL)

( * ) Notice: Subject to any disclaimer, the term of this patent is extended or adjusted under 35 U.S.C. 154(b) by 1196 days.

(21) Appl. No.: 11/906,878

(22) Filed: Oct. 4, 2007

(65) Prior Publication Data

US 2008/0107185 A1 May 8, 2008

(30) Foreign Application Priority Data

Oct. 4, 2006 (GB) .................................. 0619570.5

(51) Int. Cl.
*H04N 7/12* (2006.01)

(52) U.S. Cl.
USPC ................................ 375/240.25; 375/240.02

(58) Field of Classification Search ............. 375/240.01, 375/240.02, 240.24, 240.25
See application file for complete search history.

(56) References Cited

U.S. PATENT DOCUMENTS

| | | | |
|---|---|---|---|
| 7,009,936 B1 * | 3/2006 | Kangas et al. ................ 370/229 |
| 7,456,760 B2 * | 11/2008 | Normile et al. ................ 341/50 |
| 7,512,249 B2 * | 3/2009 | Alasia et al. .................. 382/100 |
| 7,619,645 B2 * | 11/2009 | Cockerton .................. 348/14.13 |
| 7,843,995 B2 * | 11/2010 | Bhaskaran et al. ...... 375/240.13 |
| 7,936,938 B2 * | 5/2011 | Gisquet et al. ................ 382/246 |
| 2003/0035488 A1 | 2/2003 | Barrau |
| 2003/0123540 A1 * | 7/2003 | Zhong et al. ............. 375/240.07 |
| 2005/0147163 A1 | 7/2005 | Li et al. |
| 2006/0193385 A1 * | 8/2006 | Yin et al. ................. 375/240.12 |
| 2009/0003454 A1 * | 1/2009 | Richardson et al. ...... 375/240.24 |

FOREIGN PATENT DOCUMENTS

| EP | 0 919 952 A1 | 6/1999 |
|---|---|---|
| FR | 2 796 778 A1 | 1/2001 |
| WO | WO 03/061298 A1 | 7/2003 |

OTHER PUBLICATIONS

European Search Report dated Jun. 24, 2010 in connection with European Patent Application No. EP 07 25 3938.
Fuminori Osako, et al., "A Dynamic Computation Resource Scalable Algorithm for Software Video CODEC", NTG Fachberichte, vol. 143, Sep. 10, 1997, p. 515-518.
Krisda Lengwehasatit, et al., "Probabilistic Partial-Distance Fast Matching Algorithms for Motion Estimation", IEEE Transactions on Circuits for Video Technology, vol. 11, No. 2, Feb. 2001, p. 139-152.
Joseph Yeh, et al., "Complexity Scalable Mode-Based H.263 Video Transcoding", International Conference on Image Processing, Sep. 14-17, 2003, IEEE, p. I-169-I-172.
Damien Lefol, et al., "Mode Refinement Algorithm for H.264 Intra Frame Requantization", IEEE International Symposium on Circuits and Systems, May 21-24, 2006, p. 4459-4462.
Anthony Vetro, et al., "Video Transcoding Architectures and Techniques: An Overview", IEEE Signal Processing Magazine, Mar. 2003, p. 18-29.
Jun Xin, et al., "Digital Video Transcoding", Proceedings of the IEEE, vol. 93, No. 1, Jan. 2005, p. 84-97.
Damien Lefol, et al., "An efficient complexity-scalable video transcoder with mode refinement", Signal Processing: Image Communication, vol. 22, No. 4, Apr. 19, 2007, p. 421-433.

\* cited by examiner

*Primary Examiner* — Ricky Ngo
*Assistant Examiner* — Christine Ng
(74) *Attorney, Agent, or Firm* — Munck Wilson Mandala, LLP

(57) ABSTRACT

A method of encoding scalable video data streams and an encoder configured to generate an encoded scalable video data stream is provided. The encoder includes a mode controller configured to store a plurality of encoding modes, select a sub-set of the plurality of encoding modes and select a first encoding mode. The encoder generates the encoded scalable video data stream dependent on the first encoding mode.

43 Claims, 8 Drawing Sheets

| FRAME NO. | 1 → 10 | 11 → 20 | 21 → 30 | 31 → 40 | 41 → 50 | 51 → 60 |
|---|---|---|---|---|---|---|
| Nb USER | 1 | 2 | 3 | 4 | 10 | 20 |

| FRAME NO. | 61 → 90 | 91 → 100 | 101 → 110 | 111 → 130 | 131 → 150 | 151 → 175 |
|---|---|---|---|---|---|---|
| Nb USER | 30 | 15 | 8 | 4 | 2 | 1 |

TABLE 4
RESULTS FROM THE COMPLEXITY CONTROLLER ALGORITHM

| TARGET TIME (IN MS/FRAME) | SIMULATION TIME (IN MS/FRAME) | DIFFERENCE (IN %) |
|---|---|---|
| 200 | 225.6 | 1.28 |
| 600 | 616.7 | 2.78 |
| 1200 | 1194.4 | 0.47 |
| 1800 | 1794.7 | 0.29 |
| 2400 | 2410.2 | 0.43 |
| 3000 | 3003.4 | 0.11 |

COMPLEXITY SCALABLE VIDEO TRANSCODER AND ENCODER

CROSS-REFERENCE TO RELATED APPLICATIONS

The present application is related to Great Britain Patent Application No. 0619570.5, filed Oct. 4, 2006, entitled "COMPLEXITY SCALABLE VIDEO TRANSCODER AND ENCODER". Great Britain Patent Application No. 0619570.5 is assigned to the assignee of the present application and is hereby incorporated by reference into the present disclosure as if fully set forth herein. The present application hereby claims priority under 35 U.S.C. §119(a) to Great Britain Patent Application No. 0619570.5.

TECHNICAL FIELD

The present disclosure generally relates to coding, and in particular, but not exclusively to video coding and video transcoding.

BACKGROUND

Video signals, like speech or music, are encoded for example to enable an efficient transmission or storage of the video signals.

Advanced digital video compression algorithms are now being adopted for applications including HD-DVD, video conferencing, terrestrial and satellite broadcasting. State of the art codecs, such as MPEG-4 AVC offers significant improvements over previous standards, for example reducing the bit rate of an equivalent MPEG-2 bitstream by approximately 50%.

Future applications for encoding video signals may range from multimedia content delivery on mobile handsets to High Definition television broadcasting. To allow such diversity in video distribution, it will be necessary to have means of adapting the video signal to the capacities of the available channel and/or terminal.

Possible solutions include simulcasting, where multiple versions with differing coding rates and coding methods are broadcast or delivered over the same transmission media. Such approaches are wasteful in requiring a transmission channel with a much wider bandwidth than a single encoded signal bandwidth.

Another proposed solution is the use of scalable or embedded coding, where a common or core coding layer is supplemented by additional layers of enhanced coding, so that both low bandwidth and/or low 'capacity' terminals receive the common or core layer to produce a video signal with a first quality output and higher bandwidth channels and/or higher 'capacity' terminals receive both the common or core layer and at least one further enhanced layer of the coded signal to produce an improved quality output. However, these scalable or embedded coding systems have not been developed sufficiently for robust everyday usage—and standards relating to video scalable coding are generally considered unstabilized.

A third proposed solution is the use of transcoding. Trancoding is where a first high quality bitstream is received by the terminal but that the terminal is unable to process the bitstream so to produce a video image sequence. Numerous algorithms have been developed for the requantization (transrating) of video in the last decade. Some of these, such as the Cascaded Pixel Domain Transcoder (CPDT) and the Fast Pixel Domain Transcoder (FPDT), have been used successfully.

The CPDT architecture is built around cascading a decoder with an encoder. This produces significant complexity when implemented in the terminal and thus significantly increases the processing and memory requirements by the terminal.

The FPDT architecture builds on the CPDT architecture by using linearity assumptions to merge the decoder and encoder processes into a single decoder-encoder process loop. The merging of the decoder/encoder reduces the complexity and thus the processing and memory requirements of the CPDT architecture. However the inaccuracy of the FPDT assumptions significantly limit the application of the FPDT techniques because it can not fully support modification of residual information, coding modes, etc.

Furthermore, the quality of CPDT and FPDT approaches may produce significantly lower quality outputs when compared against a full decode and recode process.

The advanced coding methods, such as MPEG-4 AVC, derive their performance benefits from the availability of a rich set of coding modes and options. These include variable block size, variable resolution motion estimation, multiple reference frames and intra prediction. The compression efficiency of these codecs is highest only when all modes are used. For example, when requantizing an MPEG-4 AVC bitstream with CPDT, the encoding decisions of the incoming bitstream are generally retained to reduce the complexity. This implies that the transcoded video uses sub-optimal encoding parameters.

SUMMARY

Embodiments of the present disclosure aim to address the above problem.

There is provided according to a first aspect of the present disclosure an encoder configured to generate an encoded scalable video data stream, wherein the encoder comprises a mode controller configured to store a plurality of encoding modes, select a sub-set of the plurality of encoding modes and select a first encoding mode, wherein the encoder generates the encoded scalable video data stream dependent on the first encoding mode.

Each mode may have an associated complexity value.

The mode controller may be configured to select the sub-set of the plurality of encoding modes dependent the statistical properties of the complexity value of each the plurality of modes.

The mode controller may be configured to select the first encoding mode dependent on the complexity value of the encoding mode.

The mode controller may be configured to select the first encoding mode further dependent the capacity value of the encoder.

The mode controller may be configured to select a second encoding mode from the sub-set of encoding modes dependent on the first encoding mode and the capacity value of the encoder.

The encoder may be further configured to monitor the capacity value of the encoder.

The encoder may be configured to define at least one threshold value, wherein the encoder is preferably configured to select the first encoding mode when the capacity value is equal to or greater than the threshold value.

The encoder is preferably configured to define at least two threshold values, wherein the encoder is preferably configured to select the first encoding mode when the capacity value is equal to or greater to a first threshold value and/or a further encoding mode when the capacity value is equal to or equal to or greater than the second threshold value and less than the first threshold value.

The capacity value of the encoder is preferably at least one of: a buffer value; a buffer filing rate.

The capacity value may be a combination of a buffer value and a buffer filling rate.

The encoded scalable data stream may comprise a plurality of frames, the encoder is preferably configured to determine an encoding time period for a current frame; and determine a target time period for a subsequent frame, wherein the encoder is preferably configured to generate a modified buffer value by adding the difference between the encoding time period and the target time period to a current buffer value.

The encoder may be further configured to determine the buffer filing rate dependent on the current buffer value and the modified buffer value.

The encoding mode may comprise a plurality of encoding parameters each of the encoding parameters having a parameter value.

Each encoding mode may comprise at least two of the following encoding parameters: an encoding algorithm; a macro-block size; a reference frame number; a motion-vector; and a refinement window size.

The mode controller is preferably configured to select the first encoding mode further dependent on a required encoded scalable data stream quality value.

A transcoder may comprise the encoder as described above.

The transcoder may be configured to receive an input encoded data stream, the input encoded data stream may comprise an input encoding mode, wherein the mode controller is preferably configured to select the first encoding mode further dependent on the input encoding mode.

The mode controller is preferably further configured to select the sub-group of encoding modes further dependent on the input encoding mode.

An electronic device may comprise an encoder or transcoder as described above.

The electronic device is preferably at least one of: a set top box; a user equipment; a personal digital assistant; a personal video player; and a personal video recorder.

According to a second aspect of the present disclosure there is provided a method for encoding a scalable video data stream, comprising: storing a plurality of encoding modes; selecting a sub-set of the plurality of encoding modes; selecting a first encoding mode from the sub-set of the plurality of encoding modes, and generating the encoded scalable video data stream dependent on the first encoding mode.

The method may further comprise associating each mode with a complexity value.

Selecting the sub-set of the plurality of encoding modes is preferably dependent on the statistical properties of the complexity value of each the plurality of modes.

The selecting the first encoding mode is preferably dependent on the complexity value of the encoding mode.

The selecting the first encoding mode is preferably further dependent on the capacity value of the encoder.

The method may further comprise selecting a second encoding mode from the sub-set of encoding modes dependent on the first encoding mode and the capacity value of the encoder.

The method may further comprise monitoring the capacity value of the encoder.

The method may further comprise defining at least one threshold value, wherein selecting the first encoding mode is preferably dependent on the capacity value being equal to or greater than the at least one threshold value.

The method may further comprise defining at least two threshold values, wherein selecting the first encoding mode is preferably dependent on the capacity value being equal to or greater to a first threshold value and/or selecting a further encoding mode when the capacity value is equal to or equal to or greater than the second threshold value and less than the first threshold value.

The capacity value of the encoder is preferably at least one of: a buffer value; a buffer filing rate.

The capacity value is preferably a combination of a buffer value and a buffer filling rate.

The encoded scalable data stream preferably comprises a plurality of frames, the method preferably further comprising: determining an encoding time period for a current frame; determining a target time period for a subsequent frame, and generating a modified buffer value by adding the difference between the encoding time period and the target time period to a current buffer value.

The method may further comprise determining the buffer filing rate dependent on the current buffer value and the modified buffer value.

The encoding mode may comprise a plurality of encoding parameters, each of the encoding parameters preferably having a parameter value.

Each encoding mode may comprise at least two of the following encoding parameters: an encoding algorithm; a macro-block size; a reference frame number; a motion-vector; and a refinement window size.

The method may further comprise selecting the first encoding mode further dependent on a required encoded scalable data stream quality value.

A method of transcoding a scalable video data stream may comprise: receiving a encoded video data stream; at least partially decoding the encoded video data stream to output a video data stream; and encoding the video data stream as described above.

The method may further comprise determining the encoding mode of the received encoded video data stream, and wherein selecting the first encoding mode is preferably further dependent on the encoding mode of the received encoded video data stream.

Selecting the sub-group of encoding modes is preferably further dependent on the encoding mode of the received encoded video data stream.

Other technical features may be readily apparent to one skilled in the art from the following figures, descriptions and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

Figure 1:
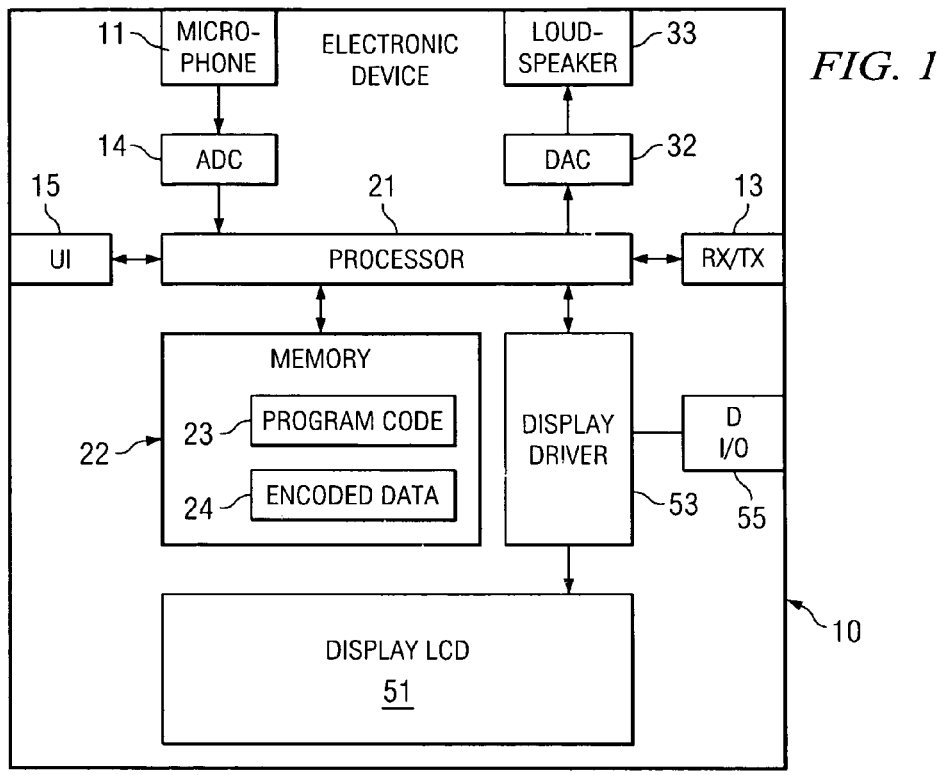
FIG. 1 shows schematically an electronic device employing one embodiment of the present disclosure.

The following describes in more detail possible control mechanisms for the provision of layered or scalable variable rate video codecs as used in both video coders and video transcoders. In this regard reference is first made to FIG. 1 schematic block diagram of an exemplary electronic device 110, which may incorporate a codec according to an embodiment of the present disclosure.

The electronic device 10 may for example be a mobile terminal or user equipment of a wireless communication system, it may also be a personal video player or a networked video player. The electronic device 10 may also be a set top box (STB) for example configured to receive digital video broadcasting transmissions—either terrestrial wireless, satellite wireless and or/via optical cable or internet connections. The electronic device may also be a personal digital assistant (PDA).

The electronic device may be configured to receive digitally encoded signals in a first format—such as those of a Digital Video Broadcasting format. The electronic device may then store digitally encoded signals in a first format for later transmission in a second format, for example for transmission over an internet protocol network to a personal video viewer. The electronic device may transcode the received signal to a separate encoding format for transmission to a further device for example via a mobile telephone network in order that the video broadcast signal may be viewed whilst the user is mobile. The electronic device may further transcode the received signal in order to store the information on memory for example to store the transcoded video data onto a hard disk drive or an optical drive for later viewing—a facility also known as time shifting.

The electronic device 10 may include a microphone 11, which is linked via an analogue-to-digital converter 14 to a processor 21. The processor 21 may be further linked via a digital-to-analogue converter 32 to loudspeaker(s) 33. The processor 21 may be further linked to a transceiver (TX/RX) 13, to a user interface (UI) 15 and to a memory 22.

The processor 21 may be configured to execute various program codes. The implemented program codes may include video decoding/encoding code, a complexity controller code which may be used to control the decoding/encoding of an incoming video signal.

The implemented program codes 23 may be stored for example in the memory 22 for retrieval by the processor 21 whenever needed. The memory 22 could further provide a section 24 for storing data, for example data that has been encoded in accordance with the present disclosure.

The encoding and decoding code may in embodiments of the present disclosure be implemented in electronic based hardware or firmware.

In other embodiments the encoding and decoding code is implemented on application specific integrated circuits (ASICS).

The user interface 15 enables a user to input commands to the electronic device 10, for example via a keypad, and/or to obtain information from the electronic device 10, for example via a display 51. The transceiver 13 enables communication with other electronic devices, for example via a wireless communication network.

The processor 21 may further be connected to a display driver 53 which provides the electrical signals required. In the embodiment shown in FIG. 1, the display driver 53 is shown connected to a LCD display unit 51 mounted on the electronic device 10 and thus the display driver provides electrical signals suitable to drive the LCD display. Furthermore, the embodiment shown in FIG. 1 further shows that the display driver 53 is connected to a Display Input/Output device D I/O 55 in order that the display driver can be connected to external displays, for example a plasma screen display, a LCD display or a CRT display unit.

In some embodiments of the present disclosure, the audio and video outputs are combined so that the display driver may be considered to be a multimedia driver providing signals to a multimedia output, for example a HDMI output.

In some embodiments of the present disclosure, there is no microphone 11, ADC 14, loud speaker 33, and DAC 32.

Furthermore, in some embodiments of the present disclosure there is no transceiver 13.

It is to be understood again that the structure of the electronic device 10 could be supplemented and varied in many ways.

A user of the electronic device 10 may use the transceiver 13 for inputting video that to be displayed on the device display 51 or external display, or alternatively transmitted to some other electronic device or to be stored in the data section 24 of the memory 22. A corresponding application may be activated to this end by the user via the user interface 15. This application, which may be run by the processor 21, causes the processor 21 to execute the encoding code stored in the memory 22.

The processor 21 may process the video signal in the way as described with reference to FIGS. 2 to 4 dependent on the type of video signal received.

The resulting processed bit stream may then be provided to the display driver 53 in the situation where the video signal was to be displayed, provided to the transceiver 13 for transmission to another electronic device in the situation where the video signal was to be passed to a further electronic device or stored in the encoded data 24 part of the memory 22 where the video signal was to be stored.

Figure 4:
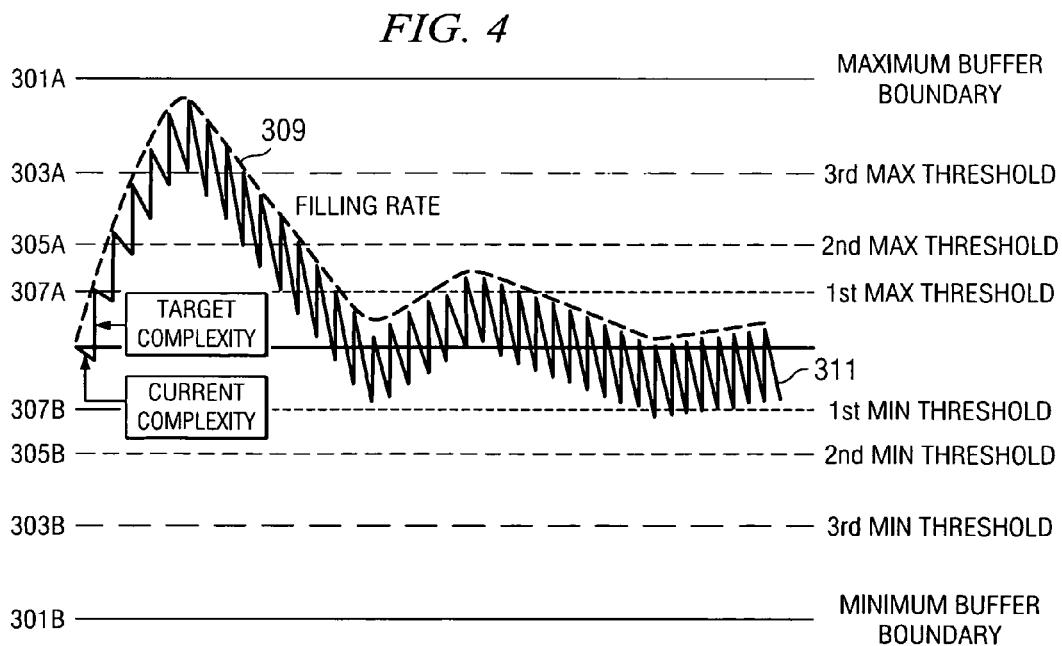
FIG. 4 shows a flow diagram illustrating the operation of the complexity controller as shown in FIGS. 2 and 3.
Figure 2:
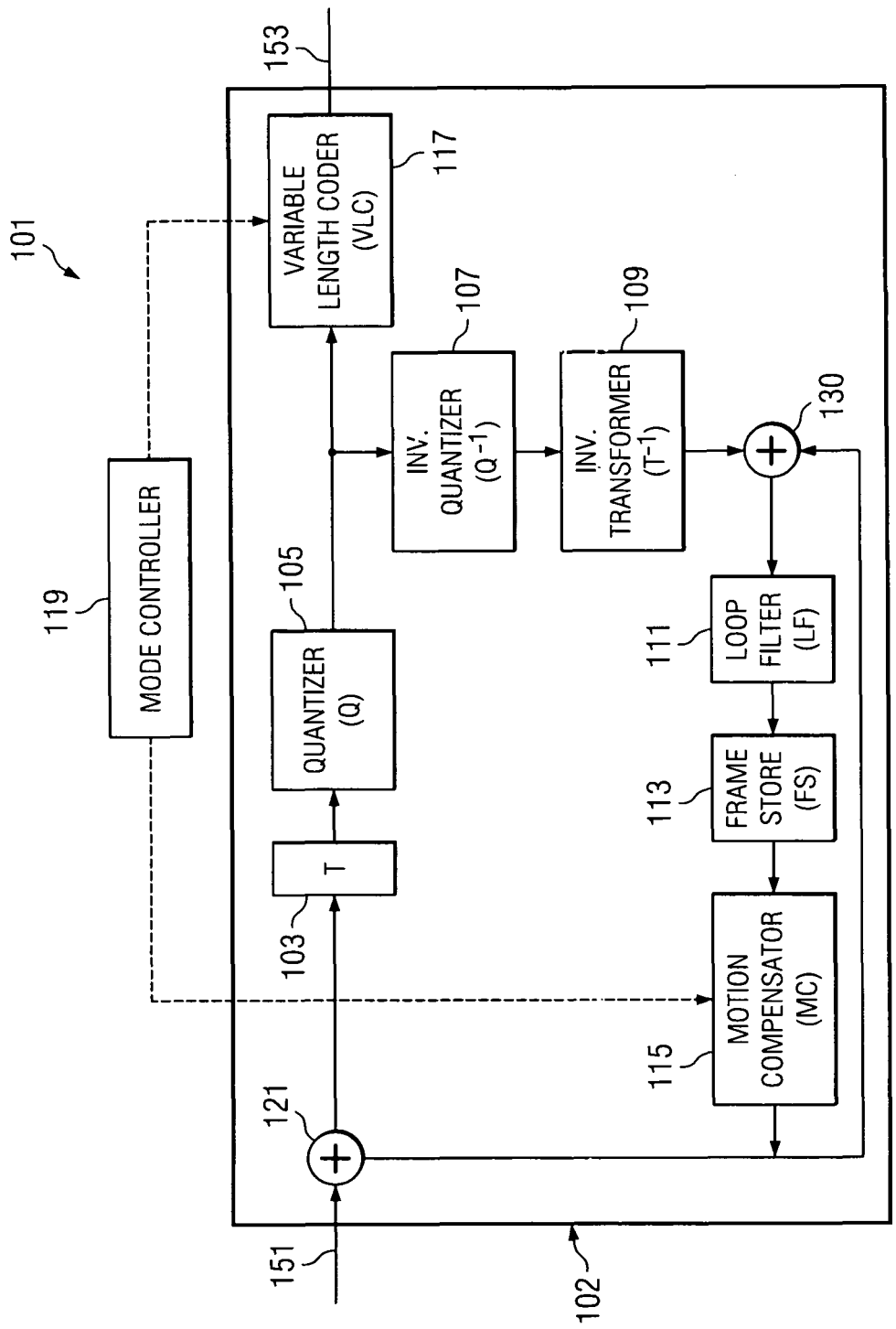
FIG. 2 shows schematically a video encoder employing an embodiment of the present disclosure.
Figure 3:
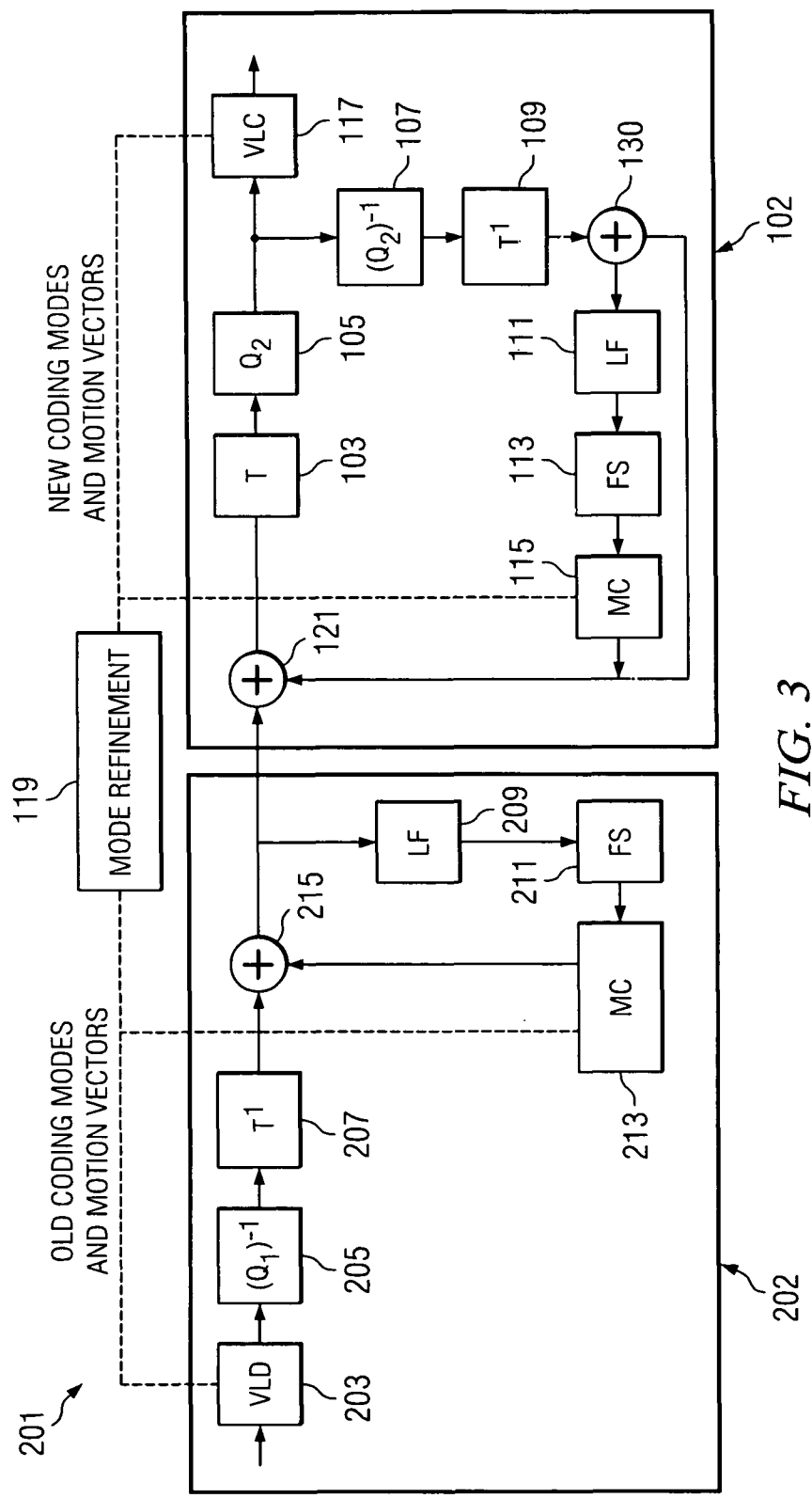
FIG. 3 shows schematically a video transcoder employing an embodiment of the present disclosure.
Figure 5:
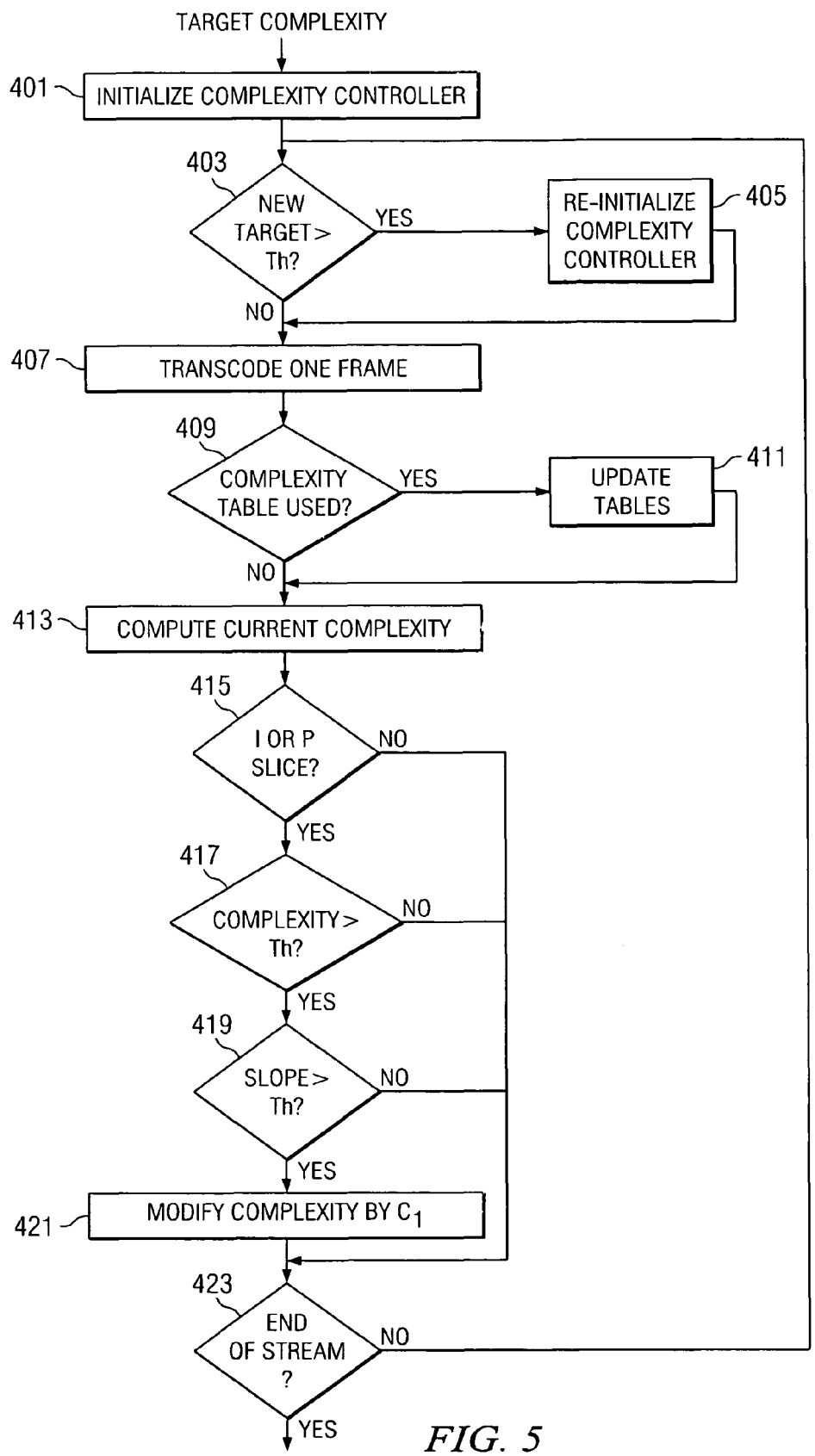
FIG. 5 shows a graphical representation of the effect of the complexity controller as shown in FIGS. 2 to 4.

It would be appreciated that the schematic structures described in FIGS. 2 and 3 and the method steps shown in FIG. 4 represent only a part of the operation of a complete video codec as exemplarily shown implemented in the electronic device shown in FIG. 1. The general operation of video codecs is known from the art and features of such codecs which do not assist in the understanding of the operation of the present disclosure are not described in detail.

The embodiment of the present disclosure video codec is now described in more detail with respect to FIGS. 2 to 5.

With respect to FIG. 2 a view of an encoder (otherwise known as the coder) embodiment of the present disclosure is shown. The encoder is configured as so to be able to produce an encoded video signal in a format suitable for storage or transmission.

The encoder includes a controllable encoding part 102 and a mode controller 119.

The encoder 101 may have an input 151 which receives the input video signal. The input video signal or bitstream is in a format suitable for encoding. This input video signal is typically referred to as the raw image data.

The controllable encoding part 102 includes a summer 121 which is connected to a transformer 103, which is connected to a quantizer 105, which is connected to a variable length coder 117. The quantizer 105 is further connected to a inverse quantizer 107, which is connected to a inverse transformer 109, which is connected to a further summer 130. The further summer 130 is connected to a loop filter 111, which is connected to a frame store 113 which is connected to a motion compensation block 115. The motion compensation block 115 is furthermore connected to the summer 122 and the further summer 130.

The input is connected to the signal summing device 121 which may be disabled in the production of intra coded frames (I-frames) which are compressed images with no reference to past or future frames, and activated in the production of predictive coded (P-frames) and bidirectionally-predictive coded frames (B-frames) where information is received from other encoded frames.

The output of the summing device 121 is connected to the transformer 103 which performs a spatial to frequency domain transform on the image data. The image data is transformed as is known by the person skilled in art by a suitable transform by dividing the image into portions or macro-blocks and processing the image data macro-block by macro-block. An example of which may be where in the coding of the I frame the received raw frame is divided into 8 pixel by 8 pixel blocks and the data in each block is transformed by a discrete cosine transform. The output of the transform is a matrix of coefficients. Following the above example, the output is an 8 by 8 matrix of coefficients. The transform converts spatial variations into frequency variations, but does not change the information in the block.

The transformer 103 is connected to the quantizer 105. The quantizer 105 receives the frequency variation information in the matrix of coefficients and performs a suitable quantization operation. As many of the coefficients, typically the high frequency components, are almost zero or close to zero it is possible to set these values to zero. Furthermore, it is possible in some embodiments of the present disclosure to reduce the number of bits representing some of the lesser importance coefficients.

The output of the quantizer 105 is connected to the variable length coder (VLC) 117 which then compresses the quantized matrix of values. Typically one corner of the quantized matrix is filled by zeros. The variable length coder (VLC) starts at the opposite corner of the matrix and zig-zags through the matrix to produce a string of coefficients. The string of coefficients are then encoded using for example run length codes to substitute strings of consecutive zeros. The processed coefficients are then further coded, for example using Huffman coding to reduce the matrix to a smaller array of values.

The frame of processed matrices representing the blocks are then output from the VLC 117 on the output 153.

The quantizer 105 is further connected to a further loop to enable motion compensation coding for the P and B frames to be carried out. The quantizer 105 is connected to an inverse quantizer ($Q^{-1}$) 107, which outputs the inverse quantized version to a frequency to spatial transformation or inverse transformer ($T^{-1}$) block 109, which in this example performs an Inverse Discrete Cosine Transform (IDCT) on the signal. The further loop also comprises a summer 130 which is connected to the inverse transformer block 109 and the output of the motion compensation block 115. The summer outputs to a frame store (FS) 113 which has an output connected to a motion compensation unit (MC) 115. The motion compensation unit is connected to the first loop summer 121 and the further loop summer 130.

In the P frames information from at least one I or P frame is used to provide further compression. The generation of a P frame is carried out by reconstructing the previous reference frame—which may be a previous I or P frame using the further loop inverse quantizer ($Q^{-1}$) and inverse transformer ($T^{-1}$) block 109. These reconstructed reference frames are stored in the memory buffer or frame store 113.

The frame being encoded is also divided then divided up into a series of groups of blocks, known as macro-blocks, for example the frame is divided up into 16 pixel by 16 pixel macroblocks. The motion compensation block 115 then searches the reconstructed reference frame to find a macroblock shaped part of the reference frame which best represents the macroblock being compressed. The offset in terms of the pixel location difference between the macroblock being compressed and the macroblock shaped part of the reference frame is then encoded as the motion vector.

As the match between the macroblock being compressed and the macroblock shaped part of the reference frame is not is not perfect the selected macroblock shaped part of the reference frame is passed from the motion compensator (MC) 115 to the summer 121 where a residual signal or residual block is generated by subtracting the macroblock shaped part of the reference frame from the macroblock being compressed. This residual information is then sent along with the motion vector so that the frame may be recreated at the decoder.

The processing of B frames is similar to that of P frame except that B frames may use both proceeding frames (I or P frames temporally before the B frame to be encoded) and succeeding frames (I or P frames temporally after the B frame to be encoded).

In some encoding processes multiple reference frames may be examined—which statistically may lead to a better level of compression as there is a greater probability of finding a good match for the macroblock to be compressed from more than one frame than from a single frame.

With respect to FIG. 3, a transcoder which may employ embodiments of the present disclosure is shown. The implementation of the transcoder 201 is to fully decode an incoming compressed bit-stream into the pixel-domain and then re-encode the decoded video into the desirable bit-rate.

The cascaded pixel-domain transcoder architecture of transcoder 201 is flexible, since decoder 202 and encoder 102 can be totally independent of each other. For example, decoder 202 and encoder 102 can operate at different bit rates, picture resolutions, coding modes, and even according to different standards. The architecture can be implemented to achieve drift-free operation if the implementations of transform in the front-encoder (the encoder which originally encoded the video data input to the transcoder) and the end-decoder (the decoder to which the transcoded video data will be used) are known. In such a case, the decoder loop and the encoder loop can be implemented to produce exactly the same reconstructed pictures as those in the front-encoder and the end-decoder, respectively.

Alternatively, if the implementations of the transforms in the front-encoder and end-decoder are not known, drift will not be significant, as long as the transforms satisfy IEEE Standard No. 1180-1990, which provides specifications for implementation of the transform, and macroblocks are refreshed as specified in other standards covering coding and communication of video signals, including the above-cited ISO/IEEE 13818-2 and ITU-T Rec. H.263. Since several coding parameters such as coding modes and motion vectors can be reused, the overall complexity of the architecture is not as high as the sum of a decoder and an encoder.

The encoder section 102 has been described previously with respect to the controllable encoder shown in FIG. 2.

The decoder section 102 includes a variable length decoder 203 which receives encoded video data and performs a decoding 203 process on an incoming bit stream from a front-encoder (not shown). The decoded data is passed to the inverse quantizer block 205 for performing an inverse quantization (IQ) and a block 207 for performing an inverse transform, which in a first embodiment of the present disclosure is an inverse discrete cosine transform (IDCT) on the output of block 207.

The inverse transform block 207 outputs the decoded bit stream which is applied to a first input of a summer 215.

Motion compensation of the decoded bit stream is performed by loop filter 209, a frame store/buffer (FS) 211 and a motion compensation (MC) unit 213 coupled between a sum output 215 and a second input of summer 215 and also coupled to receive motion vectors (MV).

The CPDT architecture 201 further comprises the mode refinement controller 119. The mode controller or complexity controller is shown connected to the motion compensation block 115 and variable length coder 117 of the encoder 101 and the variable length decoder 203 and motion compensation unit 213 of the decoder section 102.

The general operation of the decoder sections 202 and encoder sections 102 are known or described above.

The operation of the mode refinement controller/complexity controller and the effect of the operation of the mode refinement controller 119 on the decoder section 202 and encoder section 102 of the transcoder 201 and the encoder section 102 of the encoder 101 is described hereafter.

Within each encoding/decoding frame the mode refinement controller/complexity controller may be arranged to control such items as modifying the macro-block type, modifying the motion vector, selecting the prediction direction and reference frame number of any macroblock from the incoming data stream. This may be carried out to any block based coding standard.

For a macroblock (MB) in a current frame (Intraframe operations), indicated by vector $\vec{l}$, finding the best matched MB in a previous frame, indicated by $\vec{l}+\vec{v}$, means identifying the most suitable motion vector (MV) $\vec{v}$ in a search space S that minimises some metric. In some embodiments of the present disclosure the metric chosen is the sum of absolute differences (SAD) as shown in Equation 1 below.

$$\vec{v} = \arg\min SAD(\vec{l}+\vec{v}, \vec{l}) \vec{v} \in S \quad \text{(Eqn. 1)}$$

SAD is the sum of absolute difference in pixel intensity between all corresponding pixels of two macroblocks as shown in Equation 2 below.

$$SAD(\vec{l}+\vec{v},\vec{l}) = \sum_{\vec{\delta} \in B} |P_{n-i}(\vec{l}+\vec{v}+\vec{\delta}) - P_n(\vec{l}+\vec{\delta})| \, i \in F \quad \text{(Eqn. 2)}$$

In Equation 2, $P_n(\vec{x})$ is the pixel intensity value of pixel of frame n indicated by vector $\vec{x}$, and B contains the set of offset vectors $\vec{\delta}$ that points to all pixels for an MB with top left corner at (0, 0). F is the list of all possible reference frames. The size of search space S is function of the number of reference frames used F, the number of modes considered M, the prediction direction p and the size in pixels of the search windows used for motion estimation W.

The algorithm presented below allows refinement of an incoming macroblock while reusing much of the incoming information to reduce the complexity of the transcoding process. Moreover, thanks to the adaptation of S, the complexity of the mode refinement can be adapted to the processing power available to reach the highest quality for any scenario.

Furthermore between frames (interframe operations) the controller determines whether or not a macroblock should be refined. Inappropriate refinement could lead to poorer quality and/or higher complexity. This implies finding the right balance between the reduction of the search space S and the compression efficiency.

The determination by the mode controller 119 may be carried out to do the following.

The controller may limit the refinement process to MB partitions larger than 8×8, thus significantly reducing the number of modes to be considered M. A first embodiment of the present disclosure initially determines every macroblock mode in a coder larger than 8 pixels by 8 pixels, including intra 16×16. The tested modes are then compared to the incoming mode (using SAD as indicated above) and the best result is kept.

Partition modes smaller than 8×8 may then be reused in embodiments of the present disclosure from the incoming bitstream to encode areas with high motion, whereas the mode controller can provide control signals to select for larger partitions for other regions. This approach which is defined as the 'refine' mode of operation, yields good results as can be shown below. However the complexity of this mode is still relatively high.

The mode controller 119 when implemented in the transcoder may also extract key information from the incoming bitstream. For instance the mode controller may reuse the reference frame decision or the motion vector information to control the encoder 102. In some embodiments of the present disclosure the mode controller may determine which frame to use as a reference by using some metric, such as taking the most probable one from the incoming bitstream at a macroblock level, thus reducing the list of all possible reference frames F to one dimension only.

The same approach may be implemented in some embodiments of the present disclosure for motion vectors. The median of the incoming motion vectors can be used for this purpose.

For example the operation of a vector median filter over a set of k corresponding motion vectors V=(mv$_1$, mv$_2$, ..., mv$_k$) is given by Equation 3 below.

$$mv' = \operatorname{argmin} \sum_{i=1}^{k} \|mv_j - mv_i\| \, mv_j \in V \quad \text{(Eqn. 3)}$$

In Equation 3, mv' denotes the vector median and $\|\bullet\|_2$ the Euclidean norm. The resulting motion vector mv' can be refined using a small size refinement window to limit the size of motion estimation window W.

Embodiments of the present disclosure may have a large range of computational complexity scalability by varying the refinement windows search size. The algorithm using a restricted size of the search window, ws x, has been used in simulations of embodiments of the present disclosure to perform a search on up to 16 pixels. This full pixel search is always refined by a quarter pixel search around the best full picture element (pel) position.

As expected, the compression efficiency increases with the size of the refinement window, although this is accompanied by a significant increase in complexity. A good balance between quality and complexity can be obtained using a window size between 4 and 6 pixels.

In embodiments of the present disclosure statistics obtained from bitstreams requantized at different bitrates may show that small size macroblocks (8×8 and below) tend to merge when the bitrate decreases. The mode controller using this information in embodiments of the present disclosure may control the encoder/decoder sections dependent on the statistical properties in order to select specific encoding modes. The mode controller may specifically in embodiments of the present disclosure calculate the probability of transition from a given input to different output mode and use the probability to reduce the number of modes of operation dependent on the input mode.

In some encoding standards, for example MPEG-4 AVC, the mode controller 119 is restricted in operation of embodiments of the present disclosure in terms of the ability to reduce the complexity of the system if the video signal quality is to be maintained at a level similar to a full decoder and recoder system. In particular if the controller is restricted to a small set of modes of operation M, the compression efficiency, and thus quality, drops sharply.

The statistical approach described above (stat ws x), may be used by the mode controller 119 in embodiments of the present disclosure for search windows of size x (ws x) up to 6 pixels.

In one embodiment of the present disclosure, the mode controller may use the following statistical rule to restrict the number of macroblock modes.

| Output | Intra 16 × 16 | 8 × 16/16 × 8 | 16 × 16 | Skip/direct |
|---|---|---|---|---|
| Intra 16 × 16 | | | X | X |
| Intra 4 × 4 | X | | X | X |
| 8 × 8 or | | X | X | X |
| 8 × 16 and | | | X | X |
| 16 × 16 | | | | X |
| skip/direct | | | | X |

Thus, from the above frames using an intra 16×16 macroblock mode of operation may be refined by outputting a signal using a 16×16 macroblock output mode or a skip/direct (in other words to skip the frame) output mode.

An example of the complexities corresponding to the refinement algorithms described above are provided below. Both the computation time for Motion Estimation (ME) and the total transcoding (or full decode and recode) are given. The results were generated by taking the average over 30 simulations.

| mode | ME (ms/fr) | total (ms/fr) | ME (%) | total | Mean ΔPSNR (dB) | Range ΔPSNR (dB) |
|---|---|---|---|---|---|---|
| full dec rec | 7318 | 10412 | 100 | 100 | 0 | 0 to 0 |
| fdr lim set | 5801 | 7404 | 79 | 70 | −0.29 | −0.42 to −0.12 |
| refine | 2484 | 3958 | 34 | 35 | −0.22 | −0.38 to −0.07 |
| no refine | 0 | 514 | 0 | 0 | −1.55 | −3.94 to −0.47 |
| ws1 | 68 | 1253 | 1 | 7 | −0.7 | −1.22 to −0.26 |
| ws4 | 224 | 1435 | 3 | 9 | −0.53 | −0.84 to −0.22 |
| ws8 | 674 | 1946 | 9 | 14 | −0.45 | −0.72 to −0.2 |
| ws13 | 1658 | 3063 | 23 | 26 | −0.4 | −0.62 to −0.19 |
| stat ws3 | 98 | 963 | 1 | 5 | −0.7 | −1.14 to −0.29 |
| stat ws4 | 146 | 1032 | 2 | 5 | −0.67 | −1.08 to −0.28 |
| stat ws6 | 281 | 1172 | 4 | 7 | −0.62 | −0.96 to −0.28 |

The values above were produced using the simulation parameters and test sequences described below. The algorithm complexity as a percentage ranges from the minimum, no refine, to the maximum, full dec rec. To provide a fair comparison between the transcoder and a full decode and recode, the same type of motion estimation is used in both.

As discussed with some of the examples above, the mode controller 119 may provide a series of modes for coding/transcoding including mode refinement between input and output modes of operation of which produce differing complexity requirements for the transcoder/encoder.

Thus, the mode controller 119 may further determine and switch between various modes of operation in order to produce a complexity scalable transcoder/encoder which may automatically adapt its complexity to the processing power available. A transcoder/encoder using such a mode controller 119 may therefore produce the best picture quality possible for a given complexity ability and may adapt the architecture of the transcoder/coder to changes of operation environment.

The mode controller may further increase the scalability possibilities of the mode refinement process by combining the modes of operation with down-sampling and frame skipping. Down-sampling as known in the art reduces the video size and thus the amount of computation required. Frame skipping of B frames may also be carried out without requiring any computation since these frames are not used as a reference to encode further frames. It is thus possible to greatly reduce the transcoding/encoding complexity requirement by reducing frame size or rate if necessary. The modification of complexity requirement may be carried out by the mode controller 119.

With respect to a transcoder, the mode controller 119 modes of operation from most complex to least complex are: full decoding and recoding; ws x, where the value of x may be modified by steps to provide finer adjustment; stat ws x, where typically x is lower than 4; and a no refinement mode. As suggested above if further complexity reduction is required the mode controller may control the encoding to down-sample to a lower resolution. If even further complexity reduction is required, the mode controller 119 may control the encoder/decoder to perform B frame skipping, for example by first dropping one B frame and, if needed, increasing the number of B frames skipped.

Where embodiments of the mode controller 119, are used, in an encoder, similar modes of operation may be used. The scalability may be obtained by adapting, among others factors, the number of search points of the motion estimation, the number of reference frames used for prediction, the type and number of macroblock modes enabled, the frame size and the frame rate.

The modification of frame rate, frame size and search window for motion estimation affect the rate distortion properties of the video stream. When reducing the bitrate, the effect of these modifications depends on the video properties.

To show the operation of the mode controller 119, an example of how the complexity of the encoder/transcoder is selected is shown. In one embodiment of the present disclosure, the mode controller 119 generates a complexity buffer value. The complexity buffer value may be determined by comparing the time period required to code or transcode a frame of the video signal against the time period of the frame. In other words, if the complexity of the coding/transcoding of the current frame is greater than the time period of the current frame then the occupancy of the buffer, the buffer value increases. The mode controller 119 may monitors the complexity buffer value against a single or multiple occupancy thresholds. The mode controller may then switch between various complexity modes as described above dependent on the occupancy and the filling rate of the buffer value and the threshold values.

FIG. 4 shows a graphical representation of the buffer value plotted against time and showing the effect of the mode controller 119 switching complexity modes on an example of a video signal bitstream. The graph shows the buffer value 311 which is shown by the line which shows the buffer occupancy decreasing by the time period required to code or transcode a frame of the video signal (which is adjustable) followed by the buffer occupancy increasing by the time period of the frame (which is relatively constant). A first 307, second 305, third 303 and boundary 301 threshold values are shown with respect to the buffer values.

The mode controller by adjusting the complexity of the coding/transcoding may then attempt to maintain an average transcoding complexity or buffer occupancy value to be within a given margin of a given target complexity/buffer occupancy value. The target complexity/buffer occupancy value may be provided by the user or by an external constraint (for instance, in order to maintain real time transcoding capability), and provided to mode controller 119.

At the end of each encoded or transcoded frame, the complexity buffer is effectively emptied by the time used to transcode the last frame and filled by the target time for the next frame. If the target time is higher than the transcoding time, the filling rate is positive as some available complexity has not been used. On the other hand, if the target time is lower than the transcoding time, the filling rate is negative and the complexity available in the buffer decreases.

The size of the buffer and position of the thresholds may be determined in embodiments of the present disclosure to be dependant of the target complexity. In the example shown in FIG. 4, the coder/transcoder complexity is initially lower than the target complexity in other words the coder/transcoder is able to process the frame in a shorter time period than the required time period selected by the user or determined by the real time limit for the frame.

This produces a positive filling rate and the first maximum threshold 307A is passed. At this point the mode controller 119 may increase the coding/transcoding complexity.

As is shown in FIG. 4, the second max threshold 305A and third max threshold 303A may be passed and the mode controller may then affect a further increase of complexity.

In some embodiments of the present disclosure, the passing of differing thresholds causes the mode controller 119 to make differing levels of complexity changes.

In some embodiments of the present disclosure, if the complexity is above one of the maximum thresholds but the filling rate is negative and lower than a threshold the mode controller may make no changes to the complexity. In other words that the mode controller 119 may in some embodiments determine the appropriate complexity mode of operation dependent not only on the value of the complexity buffer value but also on the first derivative of the value of the complexity buffer value. For example a negative filling rate as shown in FIG. 4 produces a decreasing buffer occupancy, and thus the coding/transcoding operation is tending to return toward a stability point at the centre of the buffer. The determination of complexity mode dependent on the value and first derivative of the value reduces the possibility of over reacting control and unstable and rapidly oscillating controlling of the complexity mode.

A similar control performed by the mode controller 119 may occur when the buffer value passes one of the minimum thresholds, such as the first min threshold 307B, the second min threshold 305B, and/or the third min threshold 303B. In such cases the mode controller 119 may decrease the complexity except if the filling rate is positive and higher than a threshold.

In some embodiments of the present disclosure, the mode controller 119 determines or stores a list of impact rates, which reflect a relative difference between a first mode of coding/transcoding and a second mode of coding/transcoding. For instance modifying the window size by one pixel has an impact factor of one, whereas switching to full dec rec has an impact factor of ten.

The mode controller 119 may be configured so that mode controller 119 determines a coder/transcoder complexity correction value Cr if a threshold is passed or if the filling rate is not within the threshold [Fn, Fp]. In some embodiments of the present disclosure the strength of correction, Cr, depends on the target complexity, the threshold involved, the filling rate, the type of frame currently encoded/transcoded and the current algorithm used.

In some embodiments of the present disclosure, where the value of the correction rate Cr is higher than the impact factor defined for a given algorithm modification, this modification is immediately applied to the coder/transcoder. Using the above examples a full dec and rec will be activated only if the determined correction strength Cr is at least equal to ten.

In some embodiments of the present disclosure, where the target complexity is modified during run time, for instance to allocate processing power to another user, the buffer size, threshold and filling rate may be modified to reflect the new conditions. If the variation of complexity between the old and new targets is important it may be required to force the mode controller 119 to perform an update of the coding/transcoding algorithm without verification of the normal conditions. In other embodiments of the present disclosure, the mode controller 119 maintains the coding/transcoding using the same algorithm and the mode controller monitors the effect of the change.

In embodiments of the present disclosure, the user may initialize the mode controller 119 by selecting a starting mode of operation by selecting a predetermined or built in data table of algorithms or may specify the initial starting algorithm.

In embodiments where data tables are used, the mode controller 119 may update the table(s) in order that the controller may produce more accurate approximations. In some embodiments of the present disclosure the table(s) are saved for use by the mode controller 119 during the next operation of the coder/transcoder.

With respect to FIG. 4, a flow diagram showing the main steps involved in the operation of the mode controller according to an embodiment of the present disclosure is shown. Although the example is one of transcoding, as has been described above the same steps may also be applied to an encoding method.

The first step 401 is the initialization stage, where the buffer values and thresholds are generated. In a first embodiment of the present disclosure, by knowing the frame rate and the target complexity the mode controller 119 is arranged to initialize the values using the following equations.

current complexity=α×frame rate×target complexity max complexity=β×frame rate×target complexity min complexity=γ×frame rate×target complexity $Th_i$=current complexity+$\delta_i$×current complexity where: $\{\alpha, \beta, \gamma, \delta i\} \in R$, and: $i \in [0, 3]$ The following step 403, determines if the new target complexity is greater than a threshold. If the new target complexity is greater than a threshold then the method passes to step 405 otherwise the method passes to step 407.

In step 405, the values are re-initialized (in other words using the new target complexity value the above equations are recalculated) and the method passes to step 407.

In step 407, the next frame is transcoded. The method passes then to step 409.

In step 409, the method determines whether or not the complexity table is in use. If the complexity table is in use then the method passes to step 411, otherwise the method passes to step 413.

In step 411, the complexity table is updated using values calculated from the transcoding of the last frame. The method then passes to step 413.

In step 413, the current complexity value is calculated. As described previously in some embodiments of the present disclosure, the current complexity value may be calculated by Equation 4 below.

current complexity=current complexity−frame time+
target time      Eqn. 4)

Where current complexity represents the current complexity allowance inside the buffer, frame time is the time spent by the transcoder to process the last frame and target time is the wanted target complexity per frame.

The method then continues with step 415.

In step 415, the method determines if it is a I or P slice. If it is an I or P slice, the method passes to step 417, otherwise the method passes to step 423.

In step 417, the method determines is the current complexity is greater than a threshold value and may require a modification of the current complexity to re-establish a stable equilibrium. If the current complexity is greater than a threshold value and may require modification, the method passes to step 419, otherwise the method passes to step 423.

In step 419, the method determines whether the slope of the filling rate is greater than a threshold filling rate and thus requires a modification of the current complexity to re-establish a stable equilibrium. If the slope of the filling rate is greater than a threshold filling rate, then the method passes to step 421, otherwise the method passes to step 423.

In step 423 the method modifies the complexity of the current transcoding algorithm by the factor $C_r$. The method then passes to step 423.

In step 423, the method determines if the current frame/slice is the end of the stream. If the current frame/slice is the end of the stream, the method ends the operation, otherwise the method passes to step 403.

It would be understood that some embodiments of the present disclosure may not require the slope of the filling rate to be examined and thus this step may be bypassed. Similarly, in embodiments of the present disclosure where complexity tables are never used step 409 may be bypassed.

Simulations have been undertaken to assess the complexity and quality of the proposed apparatus and methods as embodied by the present disclosure. These simulations assessed the quality using mode refinement with fixed complexity and also explored complexity scalability under the assumption of a system with variable computational power. These simulations were based on transcoding operations, however similar improvements would be expected from coding operations.

The following example simulations describe video bitstreams using standard definition (SD) video signals with input bitrates ranging from 2 to 8 Mbps (except for test sequence 9 which features a 25 Mbps bit rate). The following table shows the types of sequence used and their encoding parameters. These sequences were selected to represent the wide range of content available in a normal consumer environment.

| sequence | test | Input bit rate (Mbps) | Output bit rate (Mbps) | details | texture | motion |
|---|---|---|---|---|---|---|
| Park run | 1 | 6.089 | 5.98 to 0.657 | ++ | ++ | + |
| shields | 2 | 7.811 | 5.53 to 0.265 | + | + | − |
| Stockholm | 3 | 5.796 | 5.64 to 0.204 | ++ | + | − |
| sunflower | 4 | 3.141 | 2.56 to 0.243 | − | ++ | −− |
| pedestrian | 5 | 4.333 | 4.25 to 0.558 | − | −− | ++ |
| tractor | 6 | 4.984 | 4.89 to 0.713 | + | ++ | ++ |
| calendar | 7 | 2.410 | 2.31 to 0.410 | + | − | + |
| PTC | 8 | 6.509 | 6.18 to 0.557 | 5, 6 and 7 concatenated | | |
| PTC HQ | 9 | 27.297 | 24.79 to 0.573 | 5, 6 and 7 concatenated | | |

Test sequences 1 to 7 were 60 frames long and were encoded in MPEG 4 AVC using the reference software JM 8.5. An intra-frame occurred every 30 frames with a frame arrangement given by the IPBBPBB structure. The input sequence was encoded using a fixed quantization parameter and a full search on all modes was done using two reference frames.

Test sequences 8 and 9 were concatenations of sequences 5, 6 and 7 and were thus 180 frames long. The first 60 frames were from "Pedestrian", frames 60 to 120 were from "Tractor" and the last 60 frames were from "Toys". These sequences were concatenated to simulate a normal consumer environment where scene changes occur regularly. The first sequence contained multiple occlusions and rapid movement, the second a tracking camera and high texture and the third, complex motions and uniform areas.

A mode of operation "fdr lim set" was included in the simulation assessment to compare the performance of the embodiments of the present disclosure implemented as part of a transcoder against a full recode strategy where only macroblock modes of size 8×8 or greater are used. Intra frames were transcoded using a known threshold refinement algorithm. The simulation of the full decode and recode method, even for the limited set, encoded intra frames using intra 4×4 and 16×16 macroblocks and with a full search. The transcoding of inter-frames was performed with or without (no refine) mode refinement. Mode refinement was simulated with a window of 16 pixels (refine) or with a restricted size (ws x). All of these modes (except no refine) included frame skipping and direct MB modes.

The first simulation analysis assumed fixed processing power of approximately 10% of the processing power required for real time encoding. In other words, the processing power assumption was that the maximum refinement window size was six pixels.

Figure 6:
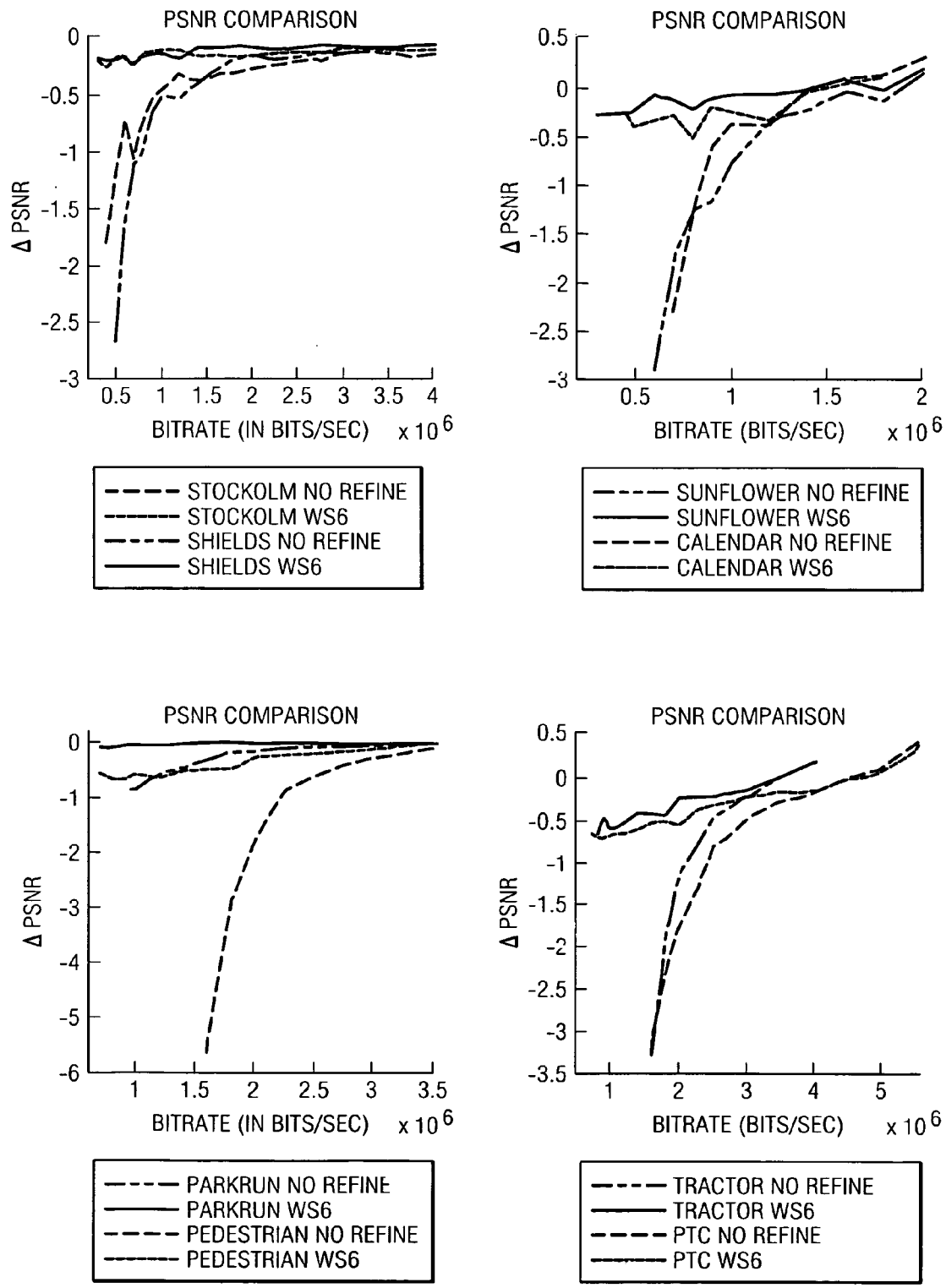
FIG. 6 shows a graphical representation of the power signal to noise ratio results for simulated transcoding operations.

With respect to FIG. 6 the difference between the ws 6 mode of operation against a no refine mode in comparison with the full dec rec transcoding. The PSNR differences (ΔPSNR) averaged across all bit rates and sequences shown in FIG. 6 are further detailed in the table described previously together with the maximum and minimum ΔPSNR values for each algorithm. From these graphs and the results from the table, it can be seen that the full decode and recode approach may give worse results than refinement mode of operation at high bitrates as it performs new encoding decisions on decoded images containing quantization noise, whereas the refinement approach retains the original modes where appropriate.

However, for low target bitrates full recode performs slightly better as the transcoding tests all reference frames and all MB modes.

The results highlight that the gain obtained by using mode refinement is sequence and bitrate dependant. In all cases however, the quality is improved with refinement by up to 5 dB. The only sequence that did not gain at least 1.5 dB with mode refinement at lower bitrates is Park run. This sequence contains high detail and texture, and when encoded at the input bitrate of 6 Mbps the quality of the video was already low. Most of the possible skip/direct MB or large partition blocks have already been selected, leaving little room for improvement in the mode refinements.

However, sequences such as pedestrian show improvements of nearly 6 dB.

Another major improvement that refinement achieves is to lower the minimum bitrate possible when requantizing. When no refinement was done, the rate distortion curves drop quicker and a compression limit was attained. For instance, the pedestrian sequence was limited to around 1.5 Mbps without mode refinement whereas the mode refinement allowed it to go down to 600 kbps. In the case of test sequence 9, the difference was even higher as no refine stopped at 2.97 Mbps whereas refine decreased to 573 kbps.

The second simulation analysis considered the case of a platform with varying processing power. The proposed transcoder was capable of dynamically scaling its complexity requirements depending on the processing power available by switching mode refinement algorithms. This switching would in embodiments of the present disclosure be carried out by the mode controller 119, the mode controller adapting the mode refinement algorithm to keep the transcoder processing time in the range previously decided.

In this simulation, a system without scalable complexity was used for comparison. The comparison method used a full decode and recode algorithm when the computational power available allowed it, otherwise the method fell back to transcoding without mode refinement.

Figures 7, 8:
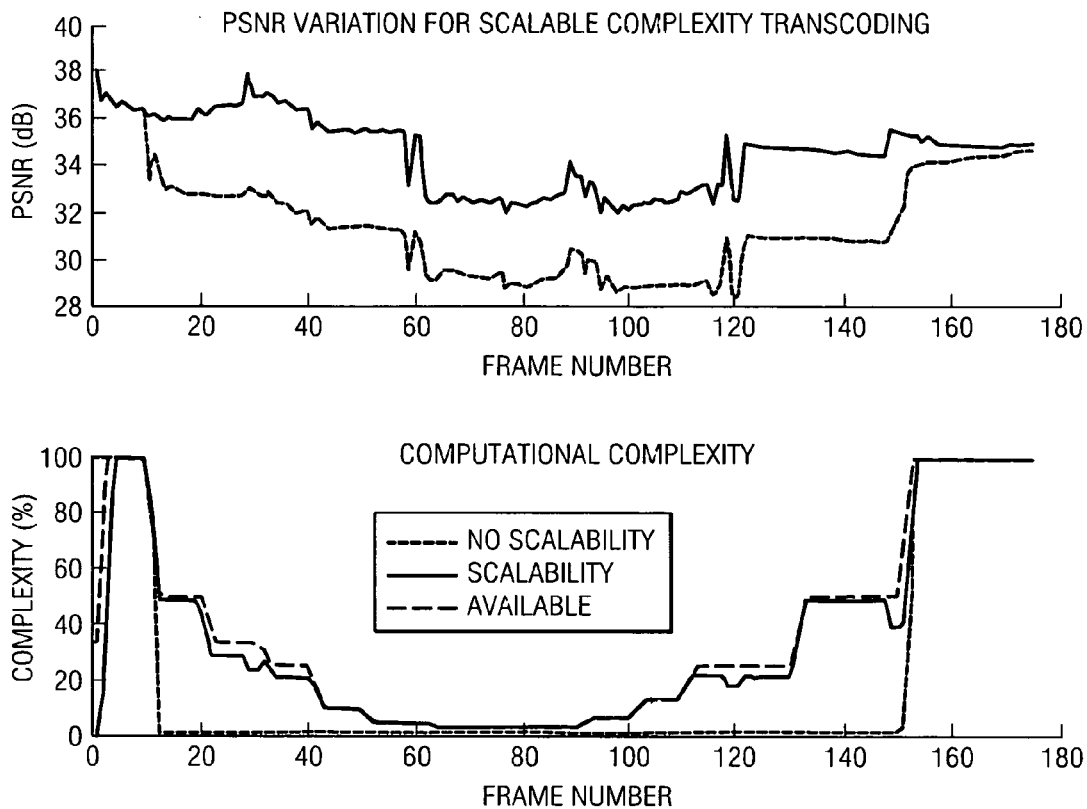
FIG. 7 shows a graphical representation of the power signal to noise ratio for scalable complexity transcoding according to an embodiment of the present disclosure.
FIG. 8 shows a table representing a possible variable load simulation scenario.

As can be seen from FIG. 8 in order to simulate a real environment the following number of users were changed during the sequence. Thus during frames 1 to 10 there was 1 user, during frames 11 to 20 there were 2 users, during frames 21 to 30 there were 3 users, during frames 31 to 40 there was 4 users, during frames 41 to 50 there were 10 users, during frames 51 to 60 there were 20 users, during frames 61 to 90 there were 30 users, during frames 91 to 100 there were 15 users, during frames 101 to 110 there were 8 users, during frames 111 to 130 there were 4 users, during frames 131 to 150 there were 2 users and during frames 151 to 175 there was 1 user.

Test sequence 8 was used for this simulation. Scene changes were observed at frames 60 and 120. The I frames occurred every 30 frames. The input bit rate was 6.5 Mbps and was encoded in the same way as described previously. The simulation process was arranged to transcode the video stream to produce a bit rate of 1.45 Mbps. Comparison at lower bitrates was not possible due to the limitation of the no refinement strategy.

With respect to FIG. 7, the advantages of scalability in a real life environment can be shown. The figures clearly show that without a scalable transcoder, the system reverts to no mode refinement as soon as more than one user accesses the system. The quality drops sharply for all bit streams when this occurs creating severe distortion for those already using the system.

FIG. 7 also shows the gains that can be obtained from scalability even at the end of a period of reduced processing power. Even when the complexity returned to 100%, the non scalable approach exhibited lower quality because it used frames transcoded without mode refinement for temporal prediction. As is shown by FIG. 7, more than 25 frames were needed to realign with the quality of the scalable approach.

Figures 9, 10:
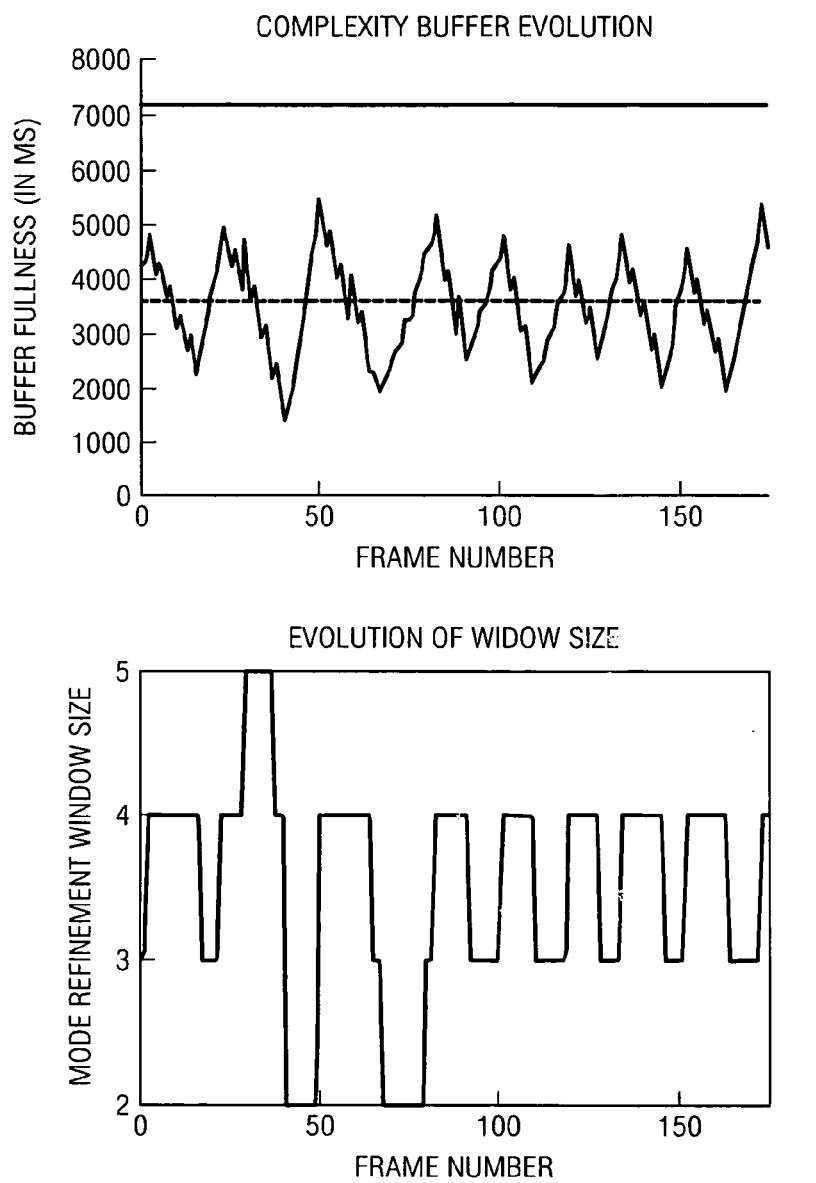
FIG. 9 shows a graphical representation of the complexity buffer and window size evolution for a target complexity.
FIG. 10 shows a table of the results from a simulation as operated on the complexity controller as shown in FIGS. 2 to 4.

Some results for the complexity controller algorithm as implemented in embodiments of the present disclosure are shown in FIGS. 9 and 10. In a simulation the target time was set at the beginning of the sequence and is kept constant throughout the sequence. The behaviour of the buffer can be seen in FIG. 9 together with the evolution of the size of window used for mode refinement (sw x and stat sw x). This figure was obtained in the case where the target complexity was determined to be 1200 ms per frame. The different plots on FIG. 9 represent the three maximum and minimum thresholds together with the current complexity allowance.

The average complexity of the sequence transcoded using our complexity controller was 1194.4 ms per frame. This demonstrates the efficiency of such a complexity control scheme as embodied by the present disclosure as the result was within 0.5% of the target complexity of 1200 ms.

FIG. 10 shows that the same kind of results may be obtained for a large range of target complexities. It can be seen that, when the target complexity dropped, the inaccuracy of the complexity controller increased. This was due to the use of B frame skip to reduce complexity. In this case, the adjustment step was not as fine as the one obtained with the modification of the mode refinement algorithm. However, even in the worse case, the maximum difference between the target time and the simulation time was less than 3%.

Figure 11:
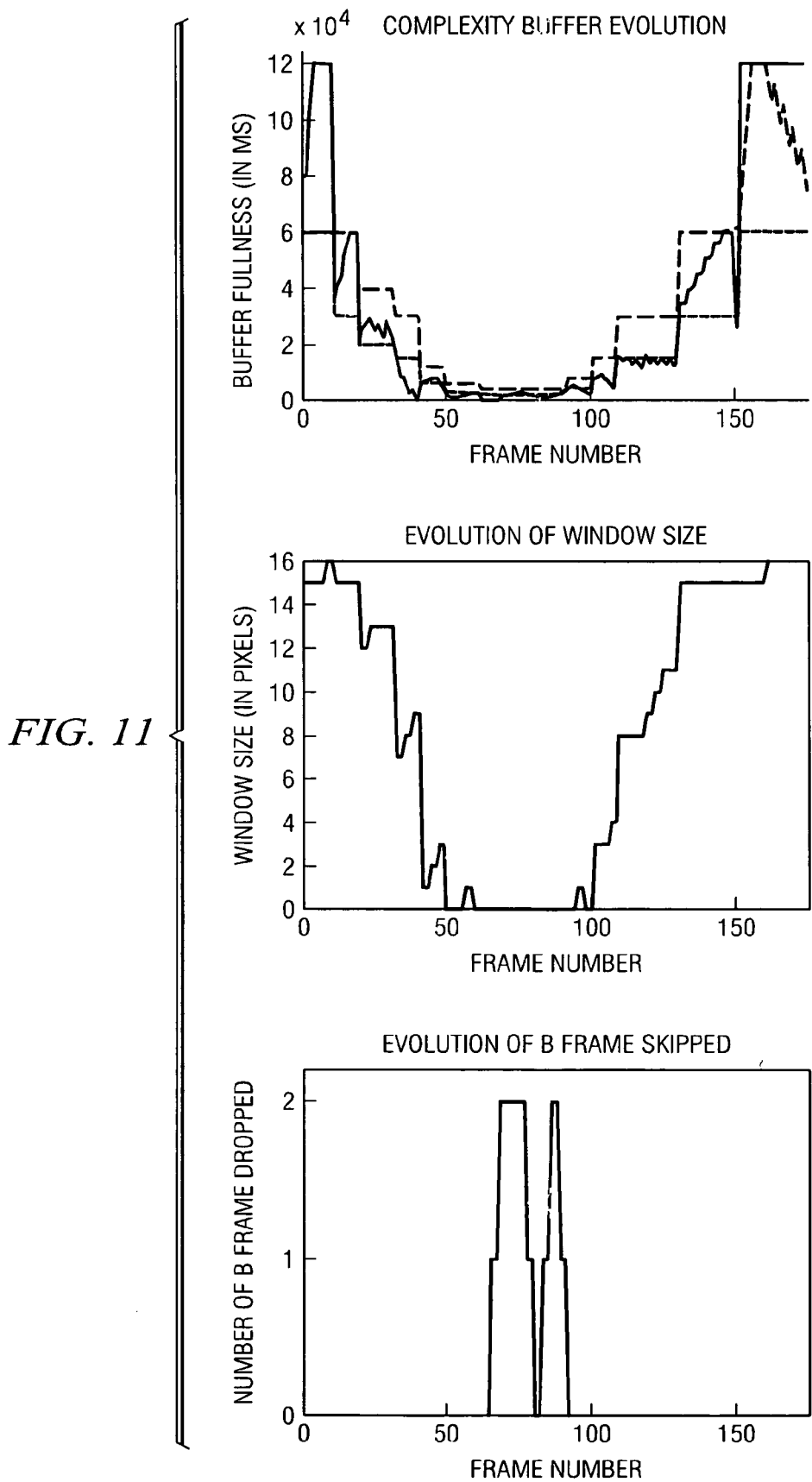
FIG. 11 shows a graphical representation of the evolution of the complexity buffer and with the evolution of the refinement window and the number of B frames skipped in the simulation as operated on by the complexity controller as shown in FIGS. 2 to 4.

FIG. 11 shows the evolution of the complexity buffer together with the evolution of the refinement window and the number of B frames skipped in the case of a scenario with changing complexity. The scenario used was the same as that described above. It can be seen that the size of the buffer and position of the threshold was modified each time the target complexity was changed.

Although the above examples describe embodiments of the present disclosure operating within a codec within an electronic device 10, it would be appreciated that the present disclosure as described below may be implemented as part of any suitable video codec. Thus, for example, embodiments of the present disclosure may be implemented in a video codec which may implement video coding over fixed or wireless communication paths.

Thus, user equipment may include a video codec such as those described in embodiments of the present disclosure above.

It shall be appreciated that the term user equipment is intended to cover any suitable type of wireless user equipment, such as mobile telephones, portable data processing devices or portable web browsers.

In general, the various embodiments of the disclosure may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

The embodiments of this disclosure may be implemented by computer software executable by a data processor of the mobile device, such as in the processor entity, or by hardware, or by a combination of software and hardware. Further in this regard it should be noted that any blocks of the logic flow as in the Figures may represent program steps, or interconnected logic circuits, blocks and functions, or a combination of program steps and logic circuits, blocks and functions.

The memory may be of any type suitable to the local technical environment and may be implemented using any suitable data storage technology, such as semiconductor-based memory devices, magnetic memory devices and systems, optical memory devices and systems, fixed memory and removable memory. The data processors may be of any type suitable to the local technical environment, and may include one or more of general purpose computers, special purpose computers, microprocessors, digital signal processors (DSPs) and processors based on multi-core processor architecture, as non-limiting examples.

Embodiments of the present disclosure may be practiced in various components such as integrated circuit modules. The design of integrated circuits is by and large a highly automated process. Complex and powerful software tools are available for converting a logic level design into a semiconductor circuit design ready to be etched and formed on a semiconductor substrate.

Programs, such as those provided by Synopsys, Inc. of Mountain View, Calif. and Cadence Design, of San Jose, Calif. automatically route conductors and locate components on a semiconductor chip using well established rules of design as well as libraries of pre-stored design modules. Once the design for a semiconductor circuit has been completed, the resultant design, in a standardized electronic format (e.g., Opus, GDSII, or the like) may be transmitted to a semiconductor fabrication facility or "fab" for fabrication.

The foregoing description has provided by way of exemplary and non-limiting examples a full and informative description of the exemplary embodiment of this present disclosure. However, various modifications and adaptations may become apparent to those skilled in the relevant arts in view of the foregoing description, when read in conjunction with the accompanying drawings and the appended claims. However, all such and similar modifications of the teachings of this disclosure will still fall within the scope of this disclosure as defined in the appended claims.

It may be advantageous to set forth definitions of certain words and phrases used in this patent document. The term "couple" and its derivatives refer to any direct or indirect communication between two or more elements, whether or not those elements are in physical contact with one another. The terms "include" and "comprise," as well as derivatives thereof, mean inclusion without limitation. The term "or" is inclusive, meaning and/or. The phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like.

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An encoder configured to generate an encoded scalable video data stream, the encoder comprising:
a mode controller configured to employ one of a plurality of encoding modes by selecting a sub-set of the plurality of encoding modes each having a minimum size macroblock partition employed in the respective mode and selecting a first encoding mode from the sub-set of encoding modes based on a change that a computational complexity associated with a refinement process for the first encoding mode will produce in a capacity value for the encoder, wherein the encoder generates the encoded scalable video data stream dependent on the first encoding mode, and
wherein the encoded scalable data stream comprises a plurality of frames, and wherein the encoder is configured to determine an encoding time period for a current frame, to determine a target time period for a subsequent frame, and to generate a modified buffer value by adding a difference between the encoding time period and the target time period to a current buffer value.

2. The encoder according to claim 1, wherein each mode has an associated complexity value.

3. The encoder according to claim 2, wherein the mode controller is configured to select the sub-set of the plurality of encoding modes dependent the statistical properties of the complexity value of each the plurality of modes.

4. The encoder according to claim 2, wherein the mode controller is configured to select the first encoding mode dependent on the complexity value of the encoding mode.

5. The encoder according to claim 4, wherein the mode controller is configured to determine a coding/transcoding complexity correction value.

6. The encoder according to claim 4, wherein the mode controller is configured to select a second encoding mode from the sub-set of encoding modes dependent on the first encoding mode and the capacity value of the encoder.

7. The encoder according to claim 1, wherein the encoder is further configured to monitor the capacity value of the encoder.

8. The encoder according to claim 1, wherein:
the encoder is configured to define at least one threshold value and to select the first encoding mode when the capacity value is equal to or greater than the threshold value.

9. The encoder according to claim 1, wherein the encoder is configured to define at least two threshold values and to select the first encoding mode when the capacity value is equal to or greater than a first threshold value and/or a further encoding mode when the capacity value is equal to or greater than the second threshold value and less than the first threshold value.

10. The encoder according to claim 1, wherein the capacity value of the encoder is at least one of:
a buffer value; and
a buffer filling rate.

11. The encoder according to claim 1, wherein the capacity value is a combination of a buffer value and a buffer filling rate.

12. The encoder according to claim 1, wherein the encoding mode comprises a plurality of encoding parameters, each of the encoding parameters having a parameter value.

13. The encoder according to claim 12, wherein each encoding mode comprises at least two of the following encoding parameters:
an encoding algorithm;
a macro-block size;
a reference frame number;
a motion-vector; and
a refinement window size.

14. The encoder according to claim 1, wherein the mode controller is configured to select the first encoding mode further dependent on a required encoded scalable data stream quality value.

15. A transcoder comprising the encoder according to claim 1.

16. The transcoder according to claim 15, wherein:
the transcoder is configured to receive an input encoded data stream,
the input encoded data stream comprises an input encoding mode, and
the mode controller is configured to select the first encoding mode further dependent on the input encoding mode.

17. The transcoder according to claim 16, wherein the mode controller is further configured to select the sub-set of encoding modes further dependent on the input encoding mode.

18. An electronic device comprising the transcoder according to claim 15.

19. The electronic device according claim 18, wherein the electronic device is at least one of:
a set top box;
a user equipment;
a personal digital assistant;
a personal video player; and
a personal video recorder.

20. An electronic device comprising the encoder according to claim 1.

21. The electronic device according to claim 20, wherein the electronic device is at least one of:
a set top box;
a user equipment;
a personal digital assistant;
a personal video player; and
a personal video recorder.

22. The method according to claim 21 wherein the encoding mode comprises a plurality of encoding parameters, each of the encoding parameters having a parameter value.

23. The method according to claim 22, wherein each encoding mode comprises at least two of the following encoding parameters:
an encoding algorithm;
a macro-block size;
a reference frame number;
a motion-vector; and
a refinement window size.

24. An encoder configured to generate an encoded scalable video data stream, the encoder comprising:
a mode controller configured to employ one of a plurality of encoding modes by selecting a sub-set of the plurality of encoding modes each having a minimum size macroblock partition employed in the respective mode and selecting a first encoding mode from the sub-set of encoding modes based on a computational complexity associated with a refinement process for the first encoding mode, wherein the encoder generates the encoded scalable video data stream dependent on the first encoding mode,
wherein each mode has an associated complexity value, wherein the mode controller is configured to select the first encoding mode dependent on the complexity value of the encoding mode and further dependent on a capacity value of the encoder, wherein the capacity value of the encoder is at least one of a buffer value and a buffer filling rate,
wherein the encoded scalable data stream comprises a plurality of frames, and wherein the encoder is configured to:
determine an encoding time period for a current frame, to determine a target time period for a subsequent frame, and
generate a modified buffer value by adding the difference between the encoding time period and the target time period to a current buffer value.

25. The encoder according to claim 24, further configured to determine the buffer filling rate dependent on the current buffer value and the modified buffer value.

26. A method for encoding a scalable video data stream, comprising:
storing a plurality of encoding modes;
selecting a sub-set of the plurality of encoding modes each having a minimum size macroblock partition employed in the respective mode;
selecting a first encoding mode from the sub-set of the plurality of encoding modes based on a change that a computational complexity associated with a refinement process for the first encoding mode will produce in a capacity value for the encoder;
generating the encoded scalable video data stream dependent on the first encoding mode, wherein the encoded scalable data stream comprises a plurality of frames;
determining an encoding time period for a current frame and a target time period for a subsequent frame; and
generating a modified buffer value by adding a difference between the encoding time period and the target time period to a current buffer value.

27. The method according to claim 26, further comprising associating each mode with a complexity value.

28. The method according to claim 27, wherein selecting the sub-set of the plurality of encoding modes is dependent the statistical properties of the complexity value of each the plurality of modes.

29. The method according to claim 27, wherein selecting the first encoding mode is dependent on the complexity value of the encoding mode.

30. The method according to claim 29, further comprising determining a coding/transcoding complexity correction value.

31. The method according to claim 29, further comprising selecting a second encoding mode from the sub-set of encoding modes dependent on the first encoding mode and the capacity value of the encoder.

32. The method according to claim 26, further comprising monitoring the capacity value of the encoder.

33. The method according to claim 26, further comprising defining at least one threshold value, wherein selecting the first encoding mode is dependent on the capacity value being equal to or greater than the at least one threshold value.

34. The method according to claim 26, further comprising defining at least two threshold values, wherein selecting the first encoding mode is dependent on the capacity value being equal to or greater than a first threshold value and/or selecting a further encoding mode when the capacity value is equal to or greater than the second threshold value and less than the first threshold value.

35. The method according to claim 26, wherein the capacity value of the encoder is at least one of:
 a buffer value; and
 a buffer filling rate.

36. The method according to claim 26, wherein the capacity value is a combination of a buffer value and a buffer filling rate.

37. The method according to claim 26, further comprising selecting the first encoding mode further dependent on a required encoded scalable data stream quality value.

38. A method for encoding a scalable video data stream, comprising:
 storing a plurality of encoding modes;
 selecting a sub-set of the plurality of encoding modes each having a minimum size macroblock partition employed in the respective mode;
 selecting a first encoding mode from the sub-set of the plurality of encoding modes based on a computational complexity associated with a refinement process for the first encoding mode;
 generating the encoded scalable video data stream dependent on the first encoding mode; and
 associating each mode with a complexity value, wherein selecting the first encoding mode is dependent on the complexity value of the encoding mode and further dependent on a capacity value of the encoder, wherein the capacity value of the encoder is at least one of a buffer value and a buffer filling rate, and wherein the encoded scalable data stream comprises a plurality of frames, the method further comprising:
 determining an encoding time period for a current frame;
 determining a target time period for a subsequent frame; and
 generating a modified buffer value by adding the difference between the encoding time period and the target time period to a current buffer value.

39. The method according to claim 38, further comprising determining the buffer filling rate dependent on the current buffer value and the modified buffer value.

40. A method of transcoding a scalable video data stream comprising:
 receiving a encoded video data stream;
 at least partially decoding the encoded video data stream to output a video data stream; and
 encoding the video data stream, wherein the encoding comprises:
  storing a plurality of encoding modes,
  selecting a sub-set of the plurality of encoding modes each having a minimum size macroblock partition employed in the respective mode,
  selecting a first encoding mode from the sub-set of the plurality of encoding modes based on a computational complexity associated with a refinement process for the first encoding mode,
  generating the encoded scalable video data stream dependent on the first encoding mode, wherein the encoded scalable data stream comprises a plurality of frames,
  determining an encoding time period for a current frame and a target time period for a subsequent frame, and
  generating a modified buffer value by adding a difference between the encoding time period and the target time period to a current buffer value.

41. The method according to claim 40, further comprising determining the encoding mode of the received encoded video data stream, wherein selecting the first encoding mode is further dependent on the encoding mode of the received encoded video data stream.

42. The method according to claim 41, wherein selecting the sub-set of encoding modes is further dependent on the encoding mode of the received encoded video data stream.

43. A computer program product embodied in a computer-readable media and configured to cause an apparatus to encode a scalable video data stream, the computer program product comprising computer-usable instructions for causing the apparatus to:
 store a plurality of encoding modes;
 select a sub-set of the plurality of encoding modes each having a minimum size macroblock partition employed in the respective mode;
 select a first encoding mode from the sub-set of the plurality of encoding modes based on a computational complexity associated with a refinement process for the first encoding mode;
 generate the encoded scalable video data stream dependent on the first encoding mode wherein the encoded scalable data stream comprises a plurality of frames;
 determine an encoding time period for a current frame and a target time period for a subsequent frame; and
 generate a modified buffer value by adding a difference between the encoding time period and the target time period to a current buffer value.

* * * * *